United States Patent [19]
Dauvergne

[11] Patent Number: 5,280,852
[45] Date of Patent: Jan. 25, 1994

[54] HEATING AND COOLING APPARATUS FOR AN ELECTRIC VEHICLE

[75] Inventor: Jean Dauvergne, Fosses, France

[73] Assignee: Valeo Thermique Habitacle, Le Mesnil-Saint-Denis, France

[21] Appl. No.: 21,806

[22] Filed: Feb. 24, 1993

[30] Foreign Application Priority Data

Feb. 25, 1992 [FR] France .................. 92 02178

[51] Int. Cl.⁵ .................................. B60H 1/02
[52] U.S. Cl. ...................... 237/12.3 A; 237/12.3 B; 454/139
[58] Field of Search ............ 237/12.3 A, 12.3 B, 237/12.3 R, 2 A; 219/202; 454/139, 162

[56] References Cited

U.S. PATENT DOCUMENTS

| | | | |
|---|---|---|---|
| 3,469,073 | 9/1969 | Zechin | 237/12.3 A |
| 4,459,466 | 7/1984 | Nakagawa et al. | 237/12.3 A |
| 4,572,430 | 2/1986 | Takagi et al. | 237/2 A |

FOREIGN PATENT DOCUMENTS

| | | |
|---|---|---|
| 348151 | 1/1928 | Belgium . |
| 1159293 | 12/1963 | Fed. Rep. of Germany . |
| 0504653 | 3/1992 | Fed. Rep. of Germany . |
| 424504 | 5/1967 | Switzerland . |

*Primary Examiner*—Henry A. Bennet
*Attorney, Agent, or Firm*—Morgan & Finnegan

[57] ABSTRACT

A motor vehicle has an electric propulsion motor which is cooled in an air radiator by air forced through the latter by a blower. The blower and air radiator are arranged in an air circuit in series with each other. The air circuit is a closed loop which includes the cabin, so that all the air passing through the air radiator comes from the cabin and can be adjustably recycled back into the cabin or exhausted to the outside. The circuit includes two parallel branches, with an auxiliary electric radiator placed in one of these branches downstream of the blower and the air radiator. A mixing valve enables the proportion of the total air flow passing through the branch containing the auxiliary radiator to be adjusted according to the heating requirements in the cabin.

6 Claims, 2 Drawing Sheets

HEATING AND COOLING APPARATUS FOR AN ELECTRIC VEHICLE

FIELD OF THE INVENTION

This invention relates to the cooling of vehicle motors, and in particular propulsion motors for electric vehicles. It also relates to the heating of the cabin of the vehicle.

BACKGROUND OF THE INVENTION

Cooling apparatus is conventionally associated with the internal combustion engines by which most motor vehicles are propelled. When weather conditions necessitate heating of the cabin of the vehicle, the heat which is removed from the engine by the cooling apparatus is sufficient to provide this heating of the cabin once the engine has reached its normal operating temperature. By contrast, if the vehicle is propelled by an engine or motor which does not generate much heat —and in particular, an electric motor—the heat which is recovered by cooling this motor is not always enough to ensure satisfactory heating of the cabin. Accordingly, under these circumstances an auxiliary heat source has to be provided, for example an electric radiator, in order to ensure that sufficient heat is available.

DISCUSSION OF THE INVENTION

An object of the present invention is to provide an apparatus for cooling the motor and for heating the cabin, with or without an auxiliary heat source, such that permanent ventilation of the cabin is obtained without creating excessive pressure in the latter.

According to the invention, cooling apparatus for a motor of a vehicle, comprising an air radiator for cooling the motor and a blower for forcing a current of air through the said air radiator, the said air radiator and blower being arranged in series in an air circuit, is characterised in that the said circuit defines a closed loop which includes the cabin of the vehicle, so that air which passes through the said air radiator comes entirely from the cabin and is then, in an adjustable manner, evacuated to the outside of the vehicle and/or recycled into the cabin, the apparatus being further characterised in that it includes an auxiliary heat source which can be operated when the heat flow transmitted through the said air radiator is insufficient for heating the cabin.

According to a preferred feature of the invention, the said circuit includes two parallel branches, comprising a first branch containing the auxiliary heat source, the two said branches being disposed in series with the said air radiator and the blower, the apparatus further including mixing means for varying the fraction of the air flow passing through the first branch in relation to the total air flow through both branches.

The auxiliary heat source is preferably in the form of an electric radiator.

According to another preferred feature of the invention, distribution means, including a distribution adjusting means, are provided in the said loop, downstream of the motor cooling radiator (i.e. the said air radiator) and the auxiliary heat source, for adjustably distributing the stream of heated air into various parts of the cabin.

According to a further preferred feature of the invention, the apparatus further includes a heated air outlet for air heated by the motor cooling radiator, together with a fresh air inlet, both of which are provided with air flow regulating means and which are disposed in the closed loop in that order, considered in the direction of the air flow, between the motor cooling radiator and the cabin.

According to yet another preferred feature of the invention, the blower is disposed in the closed loop between the said inlet and the said outlet considered in the direction of the air flow.

Further features and advantages of the invention will appear more clearly from a reading of the description, which follows, of preferred embodiments of the invention. This description is given by way of example only and with reference to the accompanying drawings.

DESCRIPTION OF PREFERRED EMBODIMENTS OF THE INVENTION

Figure 1:
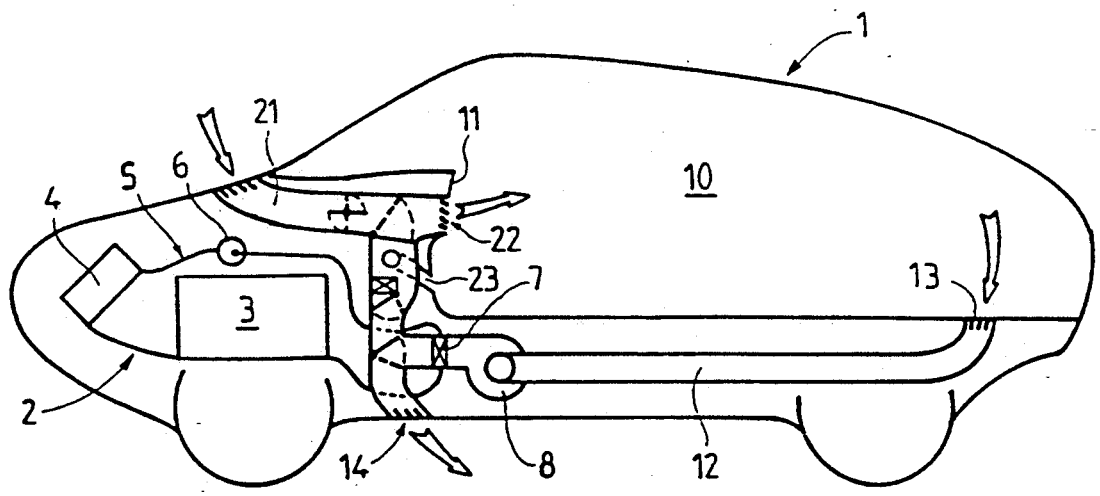
FIG. 1 is a diagrammatic side elevation of a motor vehicle which incorporates a motor cooling and cabin heating system comprising apparatus in accordance with the present invention.

The vehicle 1 shown in FIG. 1 is equipped with a power train 2 which consists of an electric propulsion motor 3 and a power regulator 4. About 5% of the power consumed by the power train 2 is dissipated in the form of heat by the electric motor 3, while the regulator 4 consumes about 10%. These heat losses are evacuated by means of a hot water loop 5, which is provided with a circulation pump 6 and an air radiator, or motor cooling radiator, 7.

The air radiator 7 is placed downstream of a blower 8 in a heating and ventilating system for the cabin 10 of the vehicle. This heating and ventilating circuit is shown in greater detail in FIG. 2. The blower 8 draws air through an inlet duct 12, the upstream end 13 of which is arranged at the rear end of the cabin 10. Downstream of the air radiator 7 there is a recycling valve 28, which enables air heated by the air radiator to be passed directly to the outside of the vehicle via an outlet 14, and selectively into two parallel branches 15 and 16 of the circuit. An auxiliary electric radiator 24 is mounted across the branch 15, so that all of the air flowing in this branch passes through the auxiliary radiator 24. The two circuit branches 15 and 16 are separated from each other by a wall 17 of the radiator 24, and by a mixing valve 25. Downstream of these two branches, one or more outlet ducts 23 lead to the lower part of the cabin 10, at the level of the feet of the occupants. Further downstream there is a distribution valve 27, leading from a fresh air inlet 21 which is equipped with a regulating valve 26, with one or more outlets 22 being arranged downstream of the distribution valve 27 and exhausting at the level of the fascia 11 of the vehicle.

Figure 2:
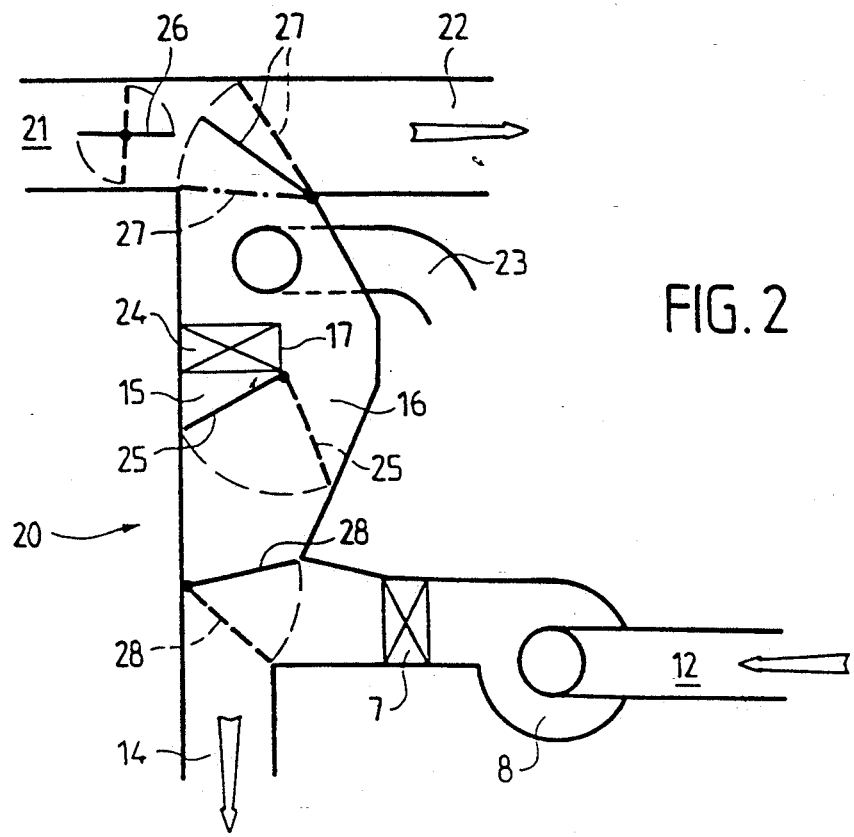
FIG. 2 is a diagrammatic view, on a larger scale, again in side elevation, of part of the same system.

The recycling valve 28 is adjustable between two extreme positions, namely a first position indicated in full lines in FIG. 2, and a second position indicated in a broken line in FIG. 2. In the first position, air heated by the air radiator 7 is entirely evacuated through the outlet 14, and is therefore not used for the purpose of heating the cabin. The blower 8 causes a slight reduction in pressure in the cabin, and if the air which is heated is not entirely recycled, this reduction in pressure is compensated for by fresh air which enters the system through the fresh air inlet 21. This air is introduced into the cabin 10 through the outlet or outlets 22 and/or 23, according to the setting of the distribution valve 27.

When the recycling valve 28 is displaced from its first position towards its second position, an increasing fraction of the air flow heated by the radiator 7 is delivered into the cabin through the branches 15 and 16 and the outlets 22 and/or 23. When the recycling valve 28 is in its second position, it closes off the outlet 14 so that all of the heated air is delivered into the cabin.

In order to pass more heat into the cabin than is provided by the radiator 7, it is necessary to use the auxiliary radiator 24, and to open the circuit branch 15 by adjusting the mixing valve 25 from a first extreme position (which is indicated in a full line in FIG. 2), to a second extreme position indicated in a broken line. In the first position all of the air flow passes into the branch 16, while in the second position all of the air passes through the branch 15.

The distribution valve 27 distributes adjustably, between the upper outlets 22 and the lower outlets 23, the air which is heated by the radiator 7 (and also if appropriate by the auxiliary radiator 24), together with the fresh air received through the inlet 21. In a first extreme position of the valve 27, indicated in a broken line, the upper outlet or outlets 23 are shut off by this valve, so that all of the air is passed to the lower outlets 23. In the second extreme position of the distribution valve 27 (indicated in a phantom line), the fresh air inlet 21 and the upper outlets 22 are connected to each other and also isolated from the remainder of the circuit by the valve 27. The fresh air introduced through the inlet 21, if the regulating valve 26 is at least partially open, is then passed entirely to the outlets 22, while the heated air is passed towards the outlets 23. In intermediate positions of the distribution valve 27, the lower outlets 23 are able to receive a mixture of fresh air and heated air. The regulating valve 26 enables the flow of fresh air passing into the cabin 10 through the fresh air inlet 21 and the heating system to be adjusted. The valve 26 may be fully closed to give total recycling of the air, in which case the recycling valve 28 must be in its second position.

Figure 3:
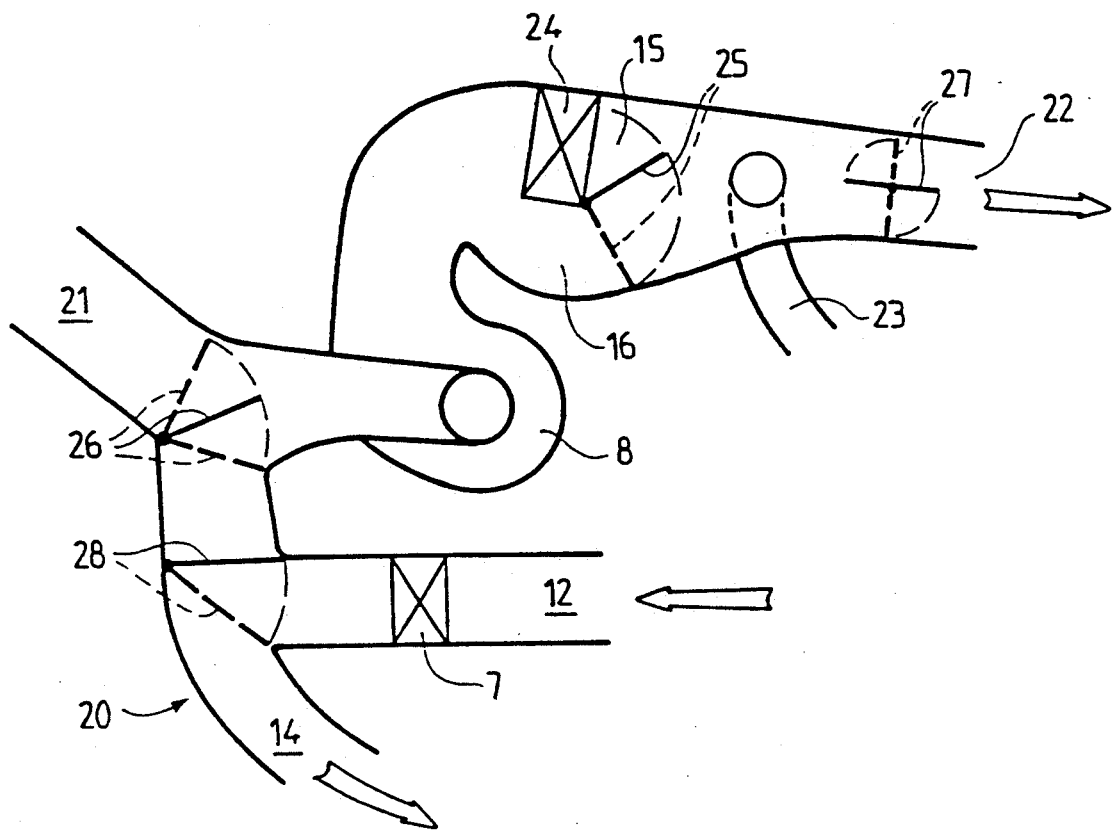
FIG. 3 shows a modification of the arrangement shown in FIG. 2.

Referring now to FIG. 3, in this modified version of the system the same reference numerals indicate those elements in FIG. 3 which are the same as, or similar to, corresponding features in FIG. 2. In both cases, the air circuit 20 comprises a closed loop in which the following elements are arranged in this order, in the direction of the air flow: the air inlet 12 from the cabin, the air radiator 7, the outlet 14 to the outside with its recycling valve 28, the two parallel circuit branches 15 and 16 (with the auxiliary radiator 24 in the first of these branches, 15), and the outlet ducts 22 and 23 leading to the cabin and having the distribution valve 27.

In the arrangement shown in FIG. 3, instead of being upstream of the air radiator 7, the blower 8 is arranged between the outlet 14 and the parallel circuit branches 15 and 16, the inlet 21 being disposed between the outlet 14 and the blower. The distribution valve 27 then no longer enables the upper outlets 22 to be directly connected to the fresh air inlet 21 as in the arrangement shown in FIG. 2. Apart from this, both systems operate in the same way.

A further modification may be applied to the arrangement shown in FIG. 3 by placing the blower 8 downstream of the circuit branches 15 and 16, that is to say between these two branches and the air outlets 22 and 23.

What is claimed is:

1. A vehicle having a cabin, a propulsion motor, and cooling apparatus for cooling the propulsion motor, in which the cooling apparatus comprises means defining an air circuit, an air radiator for cooling the motor, and a blower for producing an air stream through the said air radiator, the said air radiator and the blower being arranged in the said circuit in series, wherein the said circuit defines a closed loop through the cabin of the vehicle so that the air passing through the said air radiator is drawn entirely from the cabin, the apparatus further including regulating means whereby the air can subsequently be selectively evacuated outside the vehicle and recycled back into the cabin after passing through said radiator, the apparatus also including an auxiliary heat source arranged in the said circuit for operation when the rate of heat transfer from the air radiator is insufficient for heating the cabin.

2. A vehicle according to claim 1, wherein the said circuit includes a first branch and a second branch in parallel with each other, the said auxiliary heat source being arranged in the first branch, both branches being arranged in series with the said air radiator and blower, and the apparatus further including mixing means upstream of the two said branches for adjusting the flow of air through the first branch as a fraction of the total air flow through both branches.

3. A vehicle according to claim 1, wherein the said auxiliary heat source is an electric radiator.

4. A vehicle according to claim 1, wherein the cooling apparatus further includes distribution means for adjustably distributing, into different parts of the cabin, the air heated by the apparatus, the distribution means including distribution adjusting means arranged in the said closed loop downstream of the air radiator and the auxiliary heat source.

5. A vehicle according to claim 1, further including an air outlet for air heated by the air radiator, a fresh air inlet, and flow regulating means associated with the said heated air outlet and fresh air inlet, and wherein the heated air outlet, fresh air inlet and flow regulating means are arranged in the closed loop in that order in the direction of air flow, between the air radiator and the cabin.

6. A vehicle according to claim 5, wherein the blower is arranged in the closed loop between the said fresh air inlet and the said heated air outlet.

* * * * *